United States Patent
Cheong

(10) Patent No.: US 6,595,313 B2
(45) Date of Patent: Jul. 22, 2003

(54) STRUCTURE FOR MOUNTING ENGINE ON FRONT SIDE MEMBER OF VEHICLE

(75) Inventor: Jae-Hyuk Cheong, Ulsan-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/987,146

(22) Filed: Nov. 13, 2001

(65) Prior Publication Data

US 2002/0043421 A1 Apr. 18, 2002

(30) Foreign Application Priority Data

Jul. 3, 2001 (KR) .................................... 2001-0039436

(51) Int. Cl.⁷ ............................................. B62D 21/04
(52) U.S. Cl. ...................................... 180/312; 180/291
(58) Field of Search ................................ 180/311, 312, 180/291, 299, 300, 891; 248/554, 676

(56) References Cited

U.S. PATENT DOCUMENTS

| 4,392,545 A | * | 7/1983 | Harasaki et al. ............ 180/294 |
| 4,406,343 A | * | 9/1983 | Harasaki ..................... 180/297 |
| 4,494,723 A | * | 1/1985 | Kobuki et al. .............. 248/635 |
| 5,035,397 A | * | 7/1991 | Yamada ...................... 248/638 |
| 5,096,010 A | * | 3/1992 | Ojala et al. ................ 180/68.3 |
| 5,244,248 A | * | 9/1993 | Bovellan .................... 296/194 |
| 5,466,033 A | * | 11/1995 | Murakami et al. .......... 296/189 |
| 5,472,063 A | * | 12/1995 | Watanabe et al. .......... 180/274 |
| 6,223,850 B1 | * | 5/2001 | Rajca et al. ................ 180/377 |
| 6,386,309 B1 | * | 5/2002 | Park .......................... 180/300 |
| 6,390,437 B1 | * | 5/2002 | Hong ......................... 248/559 |

* cited by examiner

Primary Examiner—Brian L. Johnson
Assistant Examiner—Brian Swenson
(74) Attorney, Agent, or Firm—Birch, Stewart, Kolasch & Birch, LLP

(57) ABSTRACT

A structure for mounting an engine on a front side member of a vehicle is disclosed. First and second reinforcing brackets are first welded to an upper surface of the side member with a predetermined spacing therebetween, a mounting bracket is disposed between the first and second reinforcing brackets and then welded to them and the side member, the mounting bracket is welded at its rear portion to an apron side panel, and a support panel is welded between the first reinforcing bracket and the apron side panel. The structure enables an engine to be normally mounted even when a mounting point is raised from the side member due to variation of body configuration inside an engine room and specification of an engine, and enables load of an engine to be transmitted to the apron panel as well as the side member, thereby achieving stable support for an engine.

4 Claims, 3 Drawing Sheets

STRUCTURE FOR MOUNTING ENGINE ON FRONT SIDE MEMBER OF VEHICLE

BACKGROUND OF THE INVENTION

1. Field of the Invention

The present invention relates to a structure for mounting an engine on a front side member of a vehicle, and, more particularly, to a structure for mounting an engine on a front side member of a vehicle adapted to enable an engine to be firmly mounted on a vehicle having a layout of a body constituting an engine room which does not permit an engine to be directly mounted on a side member.

2. Description of the Prior Art

In general, an engine for a motor vehicle is caused to be always vibrated owing to various factors such as reciprocating motions of a piston and a connecting rod, shaking of a connecting rod and variation of rotation cycle of a crank shaft. Such vibration is transmitted to a car's passenger cab via a chassis frame or a body, thereby causing riding comfort to be deteriorated. For preventing such deterioration of riding comfort, an engine must be necessarily mounted using antivibration means(such as an insulator and a roll stopper which are generically referred to as engine mount or engine mounting).

On the other hand, since a support for an engine must alleviate or absorb vibration and withstand weight of an engine, the kind of an engine, configurations of a chassis and a body and so on must be taken into account to decide position, number and configuration of the support.

Consequently, engines are commonly mounted in various ways depending on kinds of vehicles.

Referring to FIG. 1, there is shown one of portions of a side member to which an engine is secured in case of a vehicle having an engine mounted on the side member of a front chassis frame.

In the engine mounting structure, the engine is adapted to be directly mounted on a predetermined position of an upper surface of the side member 10 without an additional fixing structure. Load of the engine transmitted to the engine mounting structure is wholly supported by the side member and is not dispersed and transmitted to peripheral body portions such as a front apron panel 20.

Where a point of the side member 10 at which an engine is mounted is greatly raised owing to considerable change of a layout during development of a certain vehicle, it is impossible to directly mount the engine on an upper surface of the side member 10.

SUMMARY OF THE INVENTION

Accordingly, the present invention has been made keeping in mind the above problems occurring in the prior art, and an object of the present invention is to provide a structure for mounting an engine on a front side member of a vehicle which is capable of stably mounting an engine even when a mounting point for an engine is greatly raised, and capable of causing load of an engine to be dispersed and transmitted to peripheral components such as an apron panel, thereby achieving more stable engine mounting, so that required strengths of components used to constitute an elevated mounting seat are lowered, thereby allowing weights of the components to be minimized.

In order to accomplish the above object, the present invention provides a structure for mounting an engine on a front side member of a vehicle comprising: a side member; first and second reinforcing brackets attached to an upper surface of the side member; a mounting bracket attached to the first and second reinforcing brackets, and coupled to an apron side panel attached to an outer surface of the side member; and a support panel attached to the apron side panel for supporting the mounting bracket.

Therefore, the present invention enables an engine to be mounted on the mounting point, which is elevated by an increment corresponding to the height of both the reinforcing brackets. Furthermore, since the mounting bracket is connected to the apron side panel, load of an engine can be divided and transmitted to other components as well as the side member.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
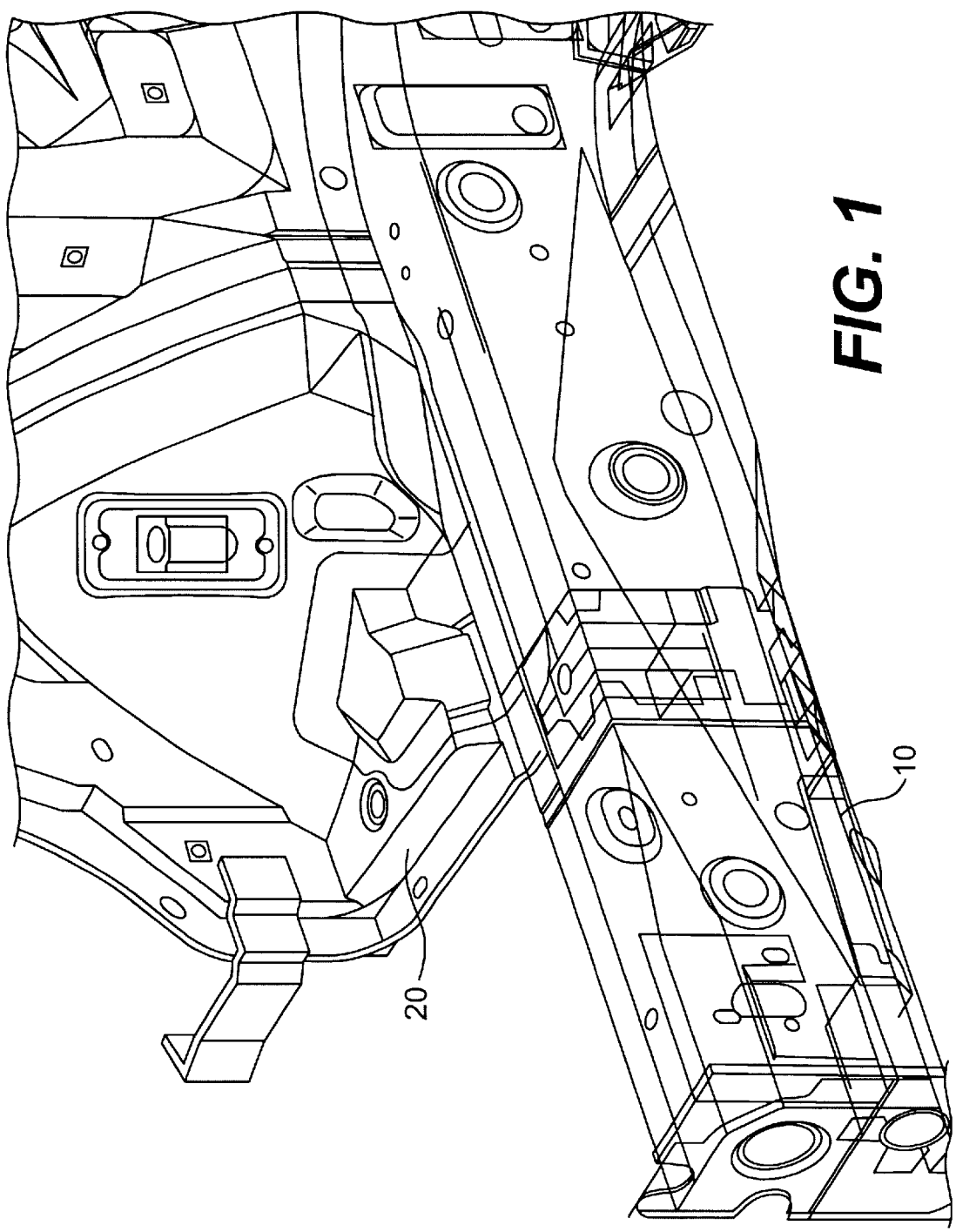
FIG. 1 is a perspective view showing a conventional structure for mounting an engine on a front side member.

Reference now should be made to the drawings, in which the same reference numerals are used throughout the different drawings to designate the same or similar components.

Figure 2:
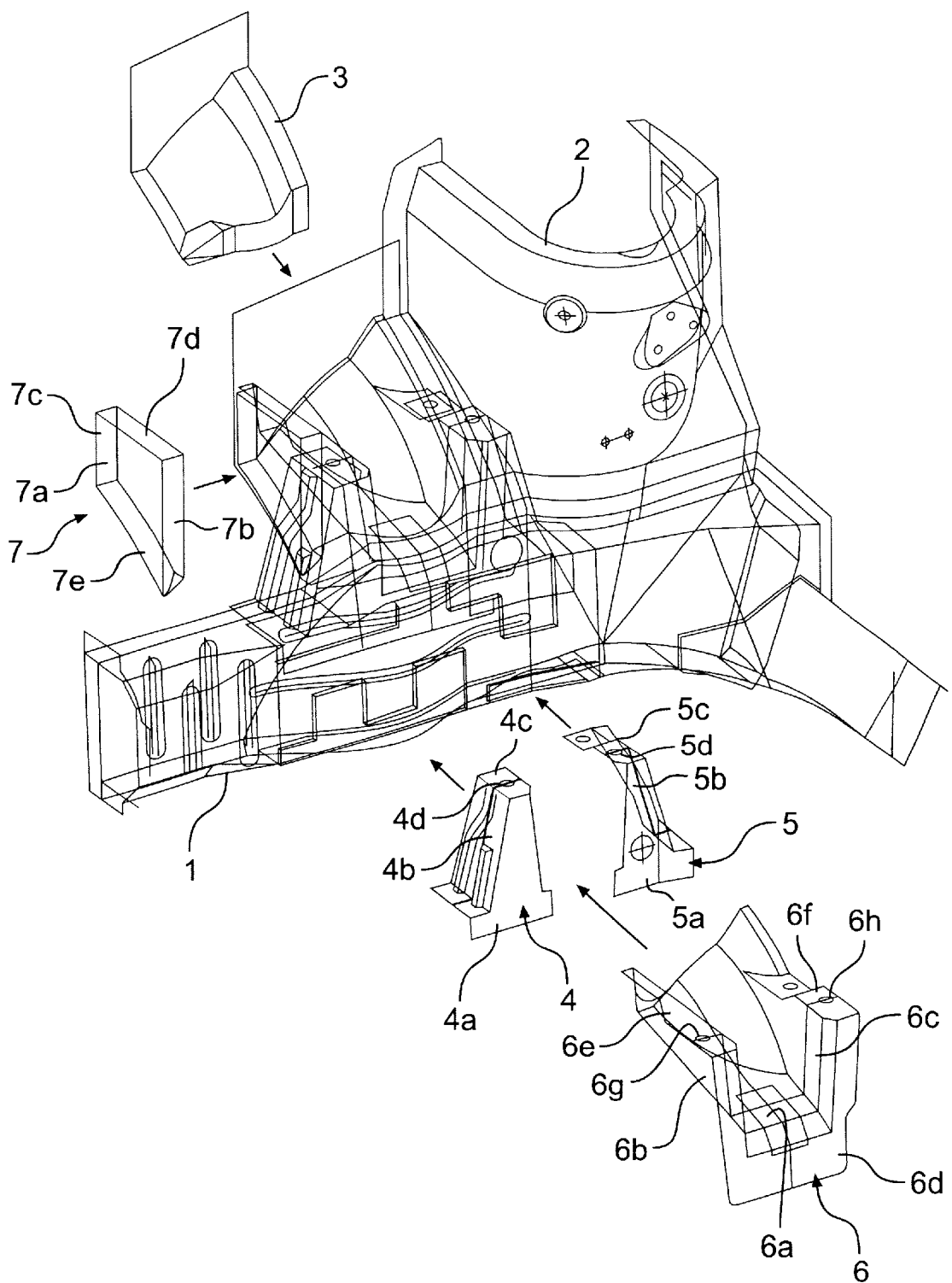
FIG. 2 is a perspective view showing a structure for mounting an engine on a front side member according to the present invention.

FIG. 2 is an exploded perspective view showing a front side member of a vehicle at which an engine is mounted. As shown in the drawing, a structure of the present invention is configured in such a way that a first reinforcing bracket 4 and a second reinforcing bracket 5 are first welded to an upper surface of the side member 1 with a predetermined spacing therebetween, a mounting bracket 6 is disposed between the first and second reinforcing brackets 4 and 5 and then welded to the first and second reinforcing brackets 4 and 5 and the side member 1, the mounting bracket 6 is welded at its rear portion to an apron side panel 3, and a support panel 7 is welded between the first reinforcing bracket 4 and the apron side panel 3.

The apron side panel 3 is welded to a side portion of an apron center panel 2 to constitute an apron together with the apron center panel 2. Both of the apron center panel 2 and the apron side panel 3 are welded to an outer surface of the side member 1.

The first and second reinforcing brackets 4 and 5 have heights corresponding to heights of engine mounting points increased by design variation. The first and second reinforcing brackets 4 and 5 comprise front trapezoidal plates 4a and 5a, outer plates 4b and 5b disposed to be perpendicular to the front trapezoidal plates 4a and 5a and to be inclined toward outside, upper plates 4c and 5c connecting upper ends of the outer plates 4b and 5b and the front plates 4a and 5a and horizontally disposed. The front plates 4a and 5a are welded at their lower ends to an upper end of an inner surface of the side member 1. Flanges formed at lower ends of the outer plates 4b and 5b are welded to an upper surface of the side member 1. The upper plates 4c and 5c are formed with bolt holes 4d and 5d for allowing bolts for mounting an engine to be passed therethrough.

The mounting bracket 6 has a bottom plate 6a and wall plates 6b and 6c positioned at opposite sides of the bottom plate 6a. A flange-shaped front plate 6d is provided at the bottom plate 6a and the both wall plates 6b and 6c. Upper plates 6e and 6f are provided at an upper end of the front plate 6d and upper ends of the both wall plates 6b and 6c to connect them. The upper plates 6e and 6f are formed with bolt holes 6g and 6h at positions corresponding to the bolt holes 4d and 5d, respectively.

A right and rear portion of the bottom plate 6a and an upper portion of the right wall plate 6c are formed in the same shape as that of a portion of the apron side panel 3 to be overlapped thereby, so that a rear portion of the mounting bracket 6 can be stably fit to the apron side panel 3.

Figure 3:
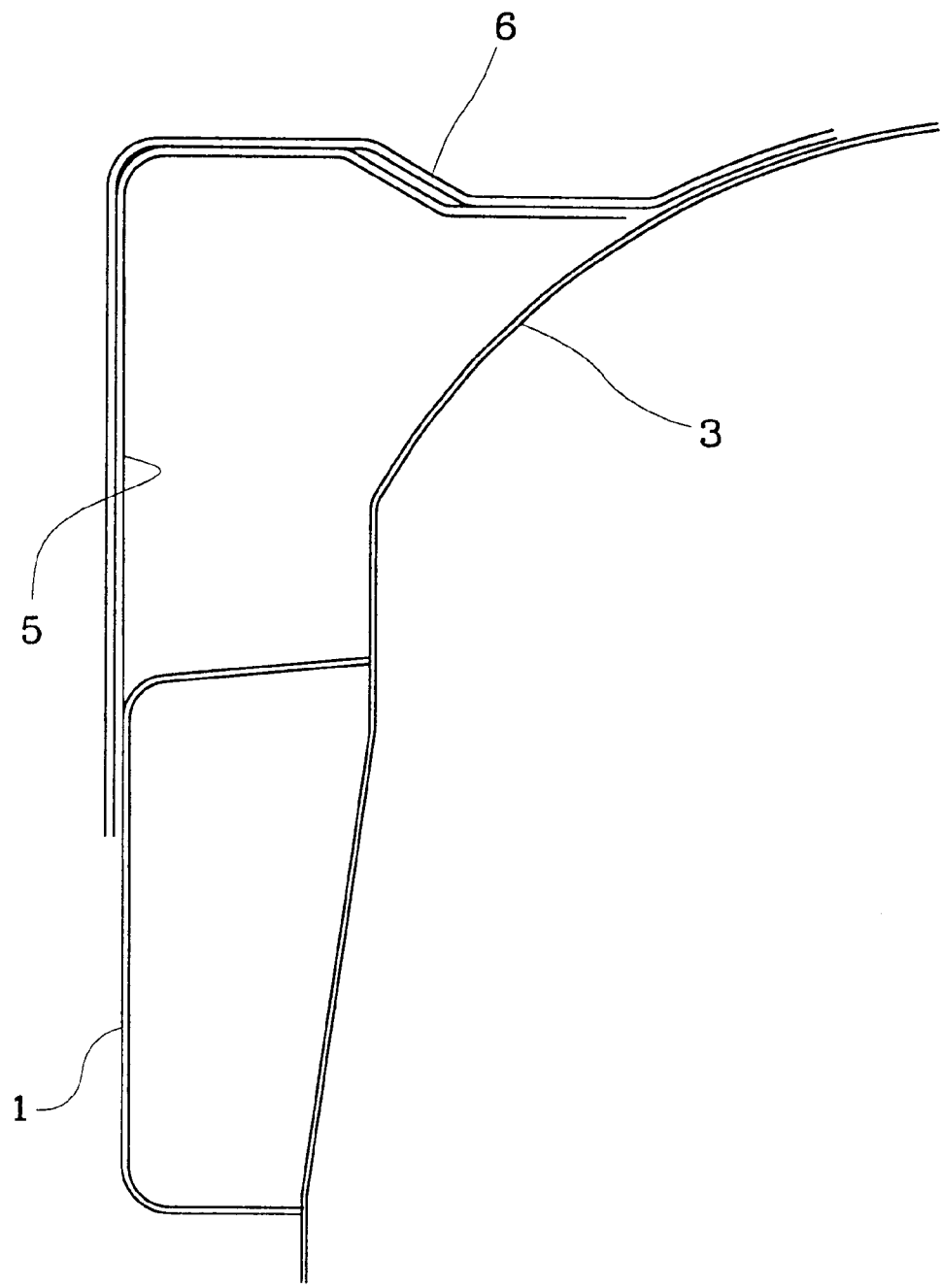
FIG. 3 is a cross-sectional view of the structure for mounting an engine according to the present invention.

Therefore, the bottom plate 6a is welded to an upper surface of the side member 1. A lower portion and both side portions are welded to an inner surface of the side member 1 and the front plates 4a and 5a of the first and second reinforcing brackets 4 and 5, respectively. The upper plates 6e and 6f of the both wall plates 6b and 6c are welded to the upper plates 4c and 5c of the first and second reinforcing brackets 4 and 5. A rear portion of the right wall plate 6c is welded to the apron side panel 3 (see FIG. 3).

The support panel 7 comprises a vertical plate 7a, a front plate 7b formed at a front end of the vertical plate 7a, a rear plate 7c at a rear end of the vertical plate 7a, an upper plate 7d at an upper end of the vertical plate 7a, and a bottom plate 7e at a lower end of the vertical plate 7a. The bottom plate 7e is formed in the same curved shape as that of a left end of the apron side panel 3.

Hence, the support panel 7 is welded at its bottom plate 7e and its rear plate 7c to the apron side panel 3. The front plate 7b of the support panel 7 is fitted to a rear opening of the first reinforcing bracket 4. The upper plate 7d is welded to a rear portion of the upper plate 6e of the mounting bracket 6.

Consequently, a right opening and a rear opening of the first reinforcing bracket 4 are closed by the left wall plate 6b of the mounting bracket 6 and the front plate 7b of the support panel 7, respectively, forming to a box-shaped structure with 6 faces closed.

As is the case with the first reinforcing bracket, the left opening and the rear opening of the second reinforcing bracket 5 are closed by the right wall plate 6c of the mounting bracket 6 and a right end of the apron side panel 3, respectively, forming to a box-shaped structure as well.

The function of the structure of the present invention will be explained hereinafter.

According to the present invention, a seating plane for mounting an engine is raised in proportion to a height of the first and second reinforcing brackets 4 and 5 and the mounting bracket 6. Consequently, it is possible to mount an engine even when an engine cannot be directly mounted on the side member 1 due to change of layout caused by variation of a body inside an engine room or a shape of an engine.

Load of an engine is supported by means of the mounting bracket 6 and the first and second reinforcing brackets 4 and 5. Since the bottom plate 6a and the both wall plates 6b and 6c of the mounting bracket 6 are coupled to the apron side panel 3, load of an engine is transmitted to the apron panel as well as the side member 1.

Therefore, since the load of the engine is transmitted to several components, it is possible to stably support the load.

Furthermore, the box-shaped structure formed by the mounting bracket 6, the first and second reinforcing brackets 4 and 5, the support panel 7, and the apron side panel 3 enables the load of the engine to be more efficiently supported. That is, the box-shaped structure of the invention can have strength equal to or higher than that obtained from a sum of strengths of separate panels constituting the conventional structure, even when strengths of the separate panels constituting the invention are lowered. Therefore, panels of the structure can be shaped to have thin thickness, thereby enabling a structure for mounting an engine to be lightweight.

As described above, the present invention provides a structure for mounting an engine on a front side member of a vehicle which allows an engine to be mounted on a side member even when an engine cannot be directly mounted because of change of layout, which causes load of an engine to be dispersed and transmitted to peripheral components such as an apron panel to stably support the engine, and which can support load of an engine with its minimum weight by forming components of the structure into an integral box-shape when a mounting point of the structure is raised.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A structure for mounting an engine on a front side member of a vehicle comprising:

a side member;

first and second reinforcing brackets attached to an upper surface of the side member;

a mounting bracket attached to the first and second reinforcing brackets, and coupled to an apron side panel attached to an outer surface of the side member; and a support panel attached to the apron side panel for supporting the mounting bracket;

wherein an inner opening and a rear opening of the first reinforcing bracket are closed by the left wall plate of the mounting bracket and the support panel, respectively, and an inner opening and the rear opening of the second reinforcing bracket are closed by the right wall plate of the mounting bracket and a right end of the apron side panel, respectively.

2. The structure for mounting an engine as set forth in claim 1, wherein each of the first and second reinforcing brackets comprises a front trapezoidal plate, an outer plate disposed to be perpendicular to the front trapezoidal plate and to be inclined toward outside, an upper plate connecting upper ends of the outer plate and the front plate and horizontally disposed.

3. The structure for mounting an engine as set forth in claim 1, wherein the mounting bracket comprises a bottom plate, wall plates positioned at opposite sides of the bottom plate, a flange-shaped front plate provided at the bottom plate and the both wall plates, and upper plates provided at an upper end of the front plate and upper ends of the both wall plates to connect them, the upper plates are formed with bolt holes for mounting an engine, respectively, and a right and rear portion of the bottom plate and an upper portion of the right wall plate are formed in the same shape as that of a portion of the apron side panel to be overlapped thereby.

4. The structure for mounting an engine as set forth in claim 1, wherein the support panel comprises a vertical plate, a front plate formed at a front end of the vertical plate, a rear plate at a rear end of the vertical plate, an upper plate at an upper end of the vertical plate, and a bottom plate at a lower end of the vertical plate, and the bottom plate is formed in the same curved shape as that of a left end of the apron side panel.

* * * * *